(No Model.) 2 Sheets—Sheet 1.
R. T. SCOWDEN.
APPARATUS FOR PURIFYING WATER.
No. 513,686. Patented Jan. 30, 1894.
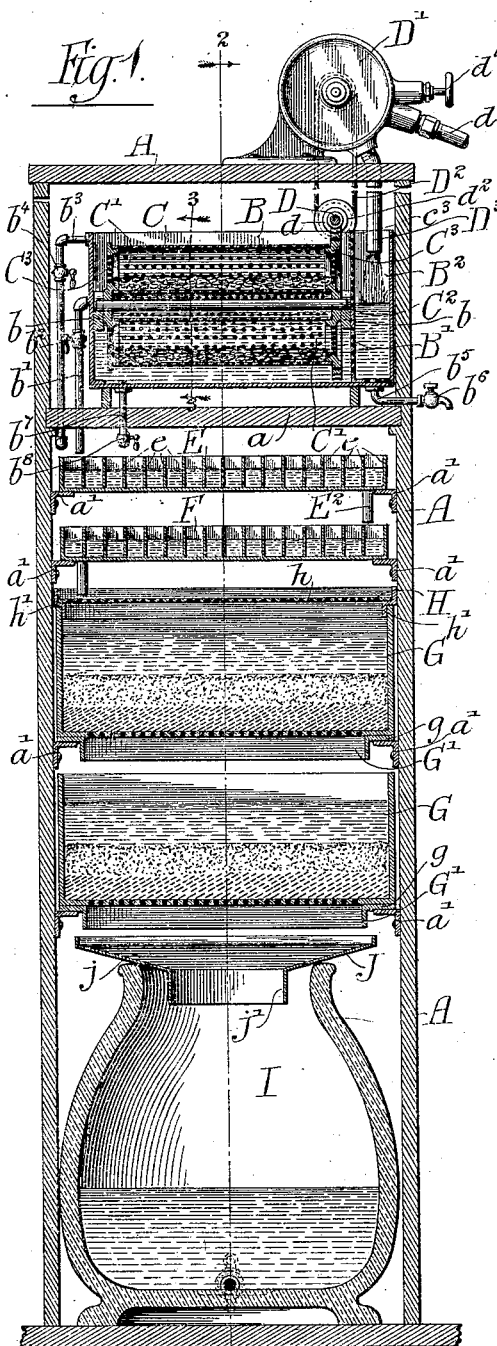
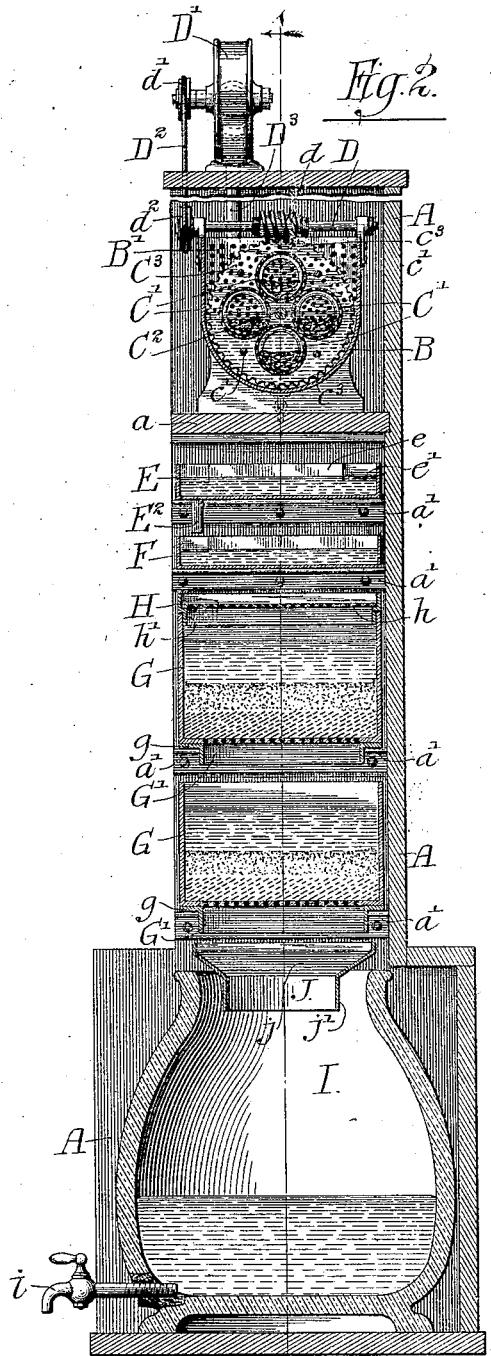
Witnesses:
Louis M. F. Whitehead.
Samuel K...
Inventor:—
Ransom T. Scowden.
by Dayton, Poole + Brown
his Attorneys.
THE NATIONAL LITHOGRAPHING COMPANY,
WASHINGTON, D. C.

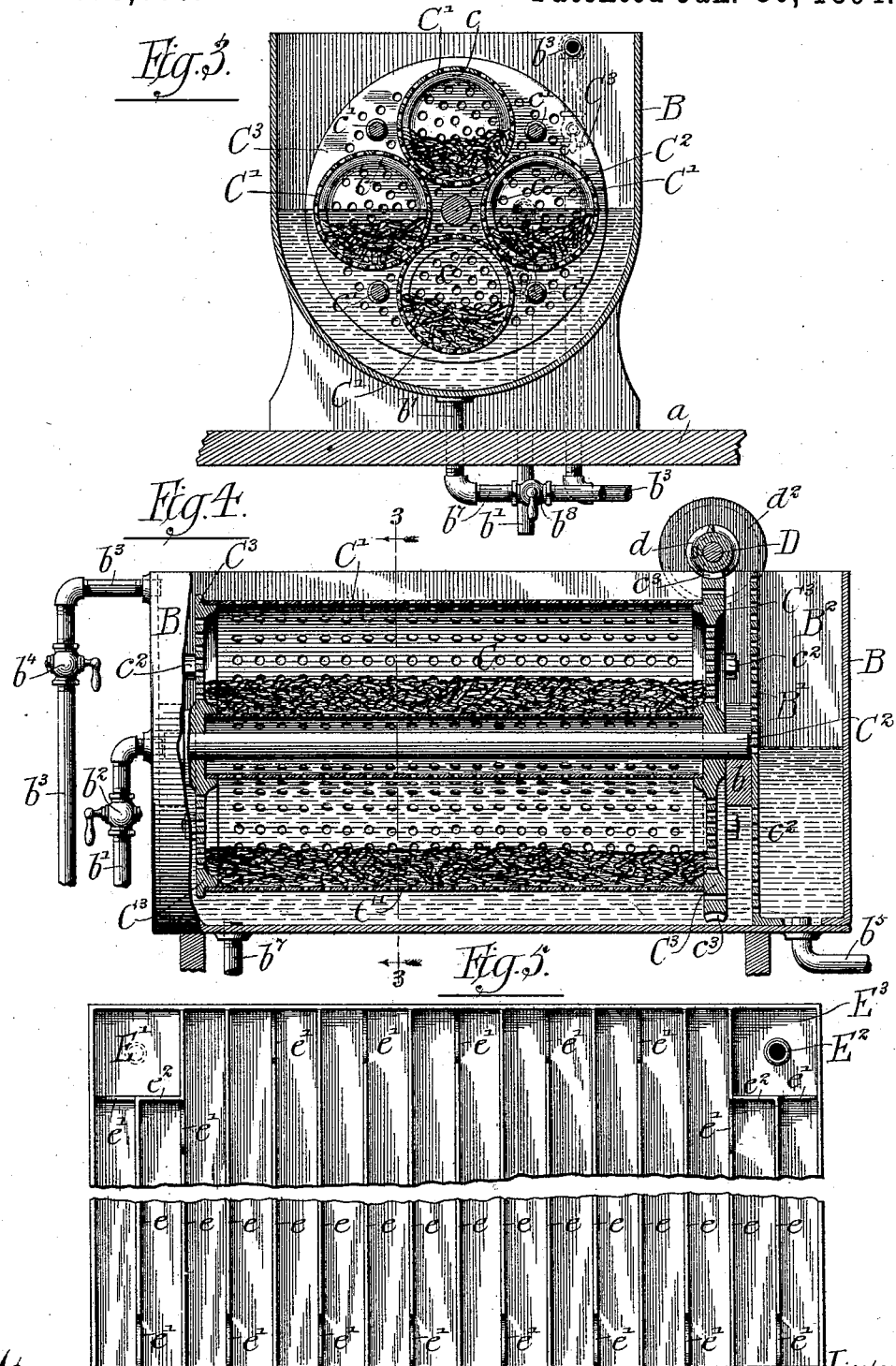

UNITED STATES PATENT OFFICE.

RANSOM T. SCOWDEN, OF CHICAGO, ILLINOIS.

APPARATUS FOR PURIFYING WATER.

SPECIFICATION forming part of Letters Patent No. 513,686, dated January 30, 1894.

Application filed December 1, 1891. Serial No. 413,635. (No model.)

*To all whom it may concern:*

Be it known that I, RANSOM T. SCOWDEN, of Chicago, in the county of Cook and State of Illinois, have invented certain new and useful Improvements in Apparatus for Purifying Water; and I do hereby declare that the following is a full, clear, and exact description thereof, reference being had to the accompanying drawings, and to the letters of reference marked thereon, which form a part of this specification.

This invention relates to apparatus for purifying water, and more particularly to apparatus employing that process known as the Anderson process, wherein the water is purified by contact with scrap iron, or iron in a finely subdivided state, such as borings, turnings, punchings or the like.

My present invention has for its object, to produce certain structural improvements generally applicable to apparatus of this class, whereby the construction is simplified and reduced in cost without sacrificing the efficiency thereof, and further, to improve several features of construction relating more particularly to that type of household apparatus set forth in an application filed by me November 10, 1891, Serial No. 411,516.

To these and other ends my present invention consists in certain novel features which I will now proceed to describe, and will then point out in the appended claims.

In the accompanying drawings, Figure 1 is a central vertical sectional view of such an apparatus, taken on the line 1—1 of Fig. 2. Fig. 2 is a similar view, taken in a plane at right angles to that in which Fig. 1 is taken, and on the line 2—2 of said Fig. 1, and looking in the direction of the arrows. Fig. 3 is an enlarged detail sectional view taken transversely through the purifier proper on the line 3—3 of Fig. 1 and looking in the direction of the arrows. Fig. 4 is a central, longitudinal vertical sectional view of the same, enlarged. Fig. 5 is a detail plan view of one of the circulating and settling trays, detached.

Referring now more particularly to the form of apparatus shown in the accompanying drawings, A represents a suitable casing or frame, which incloses and supports the various portions of the apparatus. Near its upper end this casing or frame is provided with a shelf or supporting ledge or bracket, $a$, on which is mounted the trough or tank, B, of the purifier. This trough is open at its top and has a semi-cylindrical bottom. There is provided within this trough near the receiving end thereof, a transverse upright partition, B', provided with apertures or perforations for the passage of the water, and forming at that end of the trough a receiving chamber or space, $B^2$. Within this trough is mounted a revolving purifier, C, consisting of a plurality of cylinders, C', grouped around and parallel with their axis of rotation, which in the present instance is a shaft, $C^2$. This shaft is mounted in bearings, $b$, secured to the inner side of the outlet end of the trough B and to the adjacent side of the partition B', and being preferably U bearings, open at their tops, as shown, to permit the ready removal and replacement of the shaft $C^2$. In the present instance I have shown the cylinders C' as four in number, but it is obvious that this number may be varied if it be deemed desirable. These cylinders contain the scrap iron or iron particles by which the water purification is accomplished. Mounted on the shaft $C^2$, one near each end thereof, are circular heads or end plates, $C^3$, which serve to support and close the ends of the cylinders C', each head being provided on its inner face with annular ribs or lugs, $c$, which fit within the ends of the cylinders C'. Connecting bolts, $c'$, pass through the two heads and are provided with nuts, $c^2$, by means of which the heads $C^3$ may be drawn toward each other and caused to clamp and firmly hold in position the cylinders C'. Both the cylinders and heads are apertured to permit the free passage of the water and at the same time prevent the escape of the scrap iron within the cylinders.

The relative size of the parts is such that the trough B extends above the highest point reached by the cylinders in their revolution, while the bottom of the trough is as close to the path of the cylinders as will permit a proper clearance. One of the heads $C^3$, desirably that one nearest the receiving end of the trough, is provided with a worm-gear, $c^3$, on its periphery, with which meshes a worm, $d$, on a transverse shaft, D, mounted in suitable bearings on the trough B. Motion may be imparted to this shaft in any suitable manner, and in the present instance I have shown mounted on the top of the casing A for this purpose a water-motor, D', which may be of any approved construction, a belt, D², passing over a pulley, d', on the shaft of the motor and over a pulley, d², on the shaft D.

D³ indicates the discharge pipe of the motor, which extends down to and discharges into the receiving chamber of space B' of the trough B. With this construction the water to be purified, when supplied under pressure from a pipe or reservoir, may be caused to first pass through the motor D' and thus impart movement to the revolving purifier through which said water subsequently passes. The inlet pipe d³ of the motor is provided with a valve, d⁴, by means of which the supply of water to the motor may be controlled.

The trough B is provided, at its end opposite that at which the receiving chamber B² is located, with an outlet pipe, b', communicating with the interior of the trough at about midway of its height, extending thence downward, and provided with a controlling valve, b². An overflow pipe, b³, opening into the trough B at a point near its top and above the highest point of the revolving purifier C, leads to any suitable point of discharge, and is provided with a controlling valve or cock, b⁴. The receiving chamber B² is provided with a drain pipe, b⁵, having a valve or cock, b⁶, and the body or main chamber of the trough is provided with a similar drain pipe, b⁷, having a valve, b⁸.

Immediately below the shelf a which supports the trough B there is located a circulating and settling tray, E. (See Fig. 5.) This tray is supported within the casing A by means of lateral ways, a', shown in the present instance as stops of angle iron secured to the sides of the casing and upon which the ends of the tray E rest. The tray E is provided interiorly with a plurality of transverse partitions, e, cut away for about half their height at alternate ends, as shown at e', thus forming a tortuous channel or passage of considerable length, interrupted at intervals by riffles or baffles. At one of the corners of the tray there is a receiving chamber, E', formed by extending the last partition at right angles as shown at e² and joining it to the next partition. Into this receiving chamber the outlet pipe b' of the trough B discharges. At one of the corners of the other end of the tray in a discharge chamber, E³, similar to the chamber E', an outlet pipe, E², is located, passing through the bottom of the tray and extending above the bottom a sufficient distance to prevent the escape of sediment through it. Beneath the tray E is a second tray, F, similarly constructed but reversely arranged, and supported on similar ways a'. The outlet pipe E² of the tray discharges into the receiving chamber of the tray F. Any number of these trays may be employed, as the circumstances of the case require, I having shown two in the present instance for purposes of illustration. Below the lowermost tray are located the filter tanks, G, two of these tanks being shown in the present instance, although any number from one up may be employed, as may be found desirable or necessary. Each filter tank is provided with a rectangular body having an apertured bottom for the escape of the water, and contains a filtering bed preferably composed of sand and gravel in about the proportions shown. As a means for strengthening the bottom and preventing the water from running down the sides of the casing, each tank is provided on its under side with a collar, G', formed of angle iron and having a horizontal portion, g, by means of which it is secured to the bottom of the tank, and a vertical portion extending downward from the tank bottom and forming a guiding and discharging outlet which concentrates the water centrally and prevents its escape laterally. Each tank is supported upon lateral ways a', similar to those supporting the trays E and F. The uppermost tank is provided at its top with a distributer, H, consisting of an apertured diaphragm, h, having a rabbeted marginal flange, h', by means of which it is seated in the mouth of the filtering tank and is supported thereby, being at the same time easily removable therefrom to give access to the interior of the tank.

Below the lowermost filter tank G is located the pure water receptacle, I, which in the present machine, is in the form of a jar, provided with a faucet, i, and is supported on the bottom of the casing A. Between this receptacle and the lower filter tank is a collector, J, having a hopper-shaped body, j, with inclined bottom walls, as shown, and an annular depending flange, j', which serves to properly direct the water into the jar I. This collector may rest on the mouth of the jar in the manner shown, or it may be otherwise supported in any suitable manner.

It will be noted that considerable spaces exist between the succeeding parts of the apparatus, so that the water, in passing from one part or member to the next, passes or falls through the atmosphere, and thereby becomes repeatedly and thoroughly aerated. To this further end I have shown the casing A as entirely open in front, to permit free access of the air to the interior thereof, but the said front may be closed in any suitable manner, as by open work, or by a glass or other door.

In operation, the water first passes through the motor D, thereby imparting rotary movement to the cylinders C', and passes thence through the discharge pipe of the motor into the receiving chamber B² of the trough. Thence it passes through the apertured partition B' into the body of the trough, and is there subjected to contact with the iron of the cylinders C', the said cylinders passing alternately through the air and the water, and thus effecting a thorough aeration. The water leaves the trough through the outlet pipe b', and the water is therefore maintained at a level with the mouth of said pipe. The water then passes through the circulating and settling basins E and F, where it deposits its impurities in the form of sediment, and falls upon the distributer H, by means of which it is distributed evenly over the filtering bed of the upper filter G. Passing through the filter beds, and being finally purified in its passage, the water is gathered by the collector J and discharged into the receptacle I, whence it may be drawn as needed by means of the faucet $i$.

When the apparatus is not in use the valve $b^2$ is closed and the water permitted to rise in the trough B to the height of the mouth of the overflow pipe $b^3$, when the water will cover the cylinders and prevent oxidation of the parts.

As sediment rapidly accumulates, it is desirable that the same may be readily removed for cleaning. In the apparatus described, this may be readily effected, since the trays and filter tanks may each be drawn out of the casing A, sliding on the ways $a'$, and entirely withdrawn from the casing and cleaned. They may be replaced when clean with equal facility. By opening the cocks $b^6$ and $b^8$, of the pipes $b^5$ and $b^7$ the receiving chamber and body of the trough may be thoroughly washed out and the sediment discharged through these pipes.

The entire revolving purifier proper C may be lifted out of the trough B, and access may be had to the interior of the cylinders C′ for the purpose of renewing their charge by loosening the bolts $c'$ which connect the heads or end plates $C^3$. The shaft $C^2$ does not extend through the trough, but has its bearings wholly within the same, so that no stuffing boxes are needed, leakage being done away with. The open topped bearings permit the shaft $C^2$ to be readily lifted out and replaced.

The shaft D is so constructed as to allow it to be readily removed from its bearings in order to permit the lifting out from the trough B of the purifier C. The several cylinders C′ may be provided with suitable hand holes having closures to permit access to the interior of the cylinders without disconnecting them from the head or removing them from the trough.

What I claim is—

1. In an apparatus for purifying water, the combination with a water tank or receptacle of a revolving purifier having a plurality of parallel apertured cylinders arranged equidistant from their axis of rotation, and containing purifying material substantially as described.

2. In an apparatus for purifying water, the combination with a water tank or receptacle of a revolving purifier having a plurality of parallel apertured cylinders containing purifying material, two heads, provided with seats for the ends of said cylinders, and means for connecting said heads, substantially as described.

3. In an apparatus for purifying water, the combination, with a water tank or receptacle, of a plurality of parallel apertured cylinders, of end plates or heads each provided with a plurality of annular ribs or lugs to fit within the ends of the respective cylinders, and through bolts connecting said heads, substantially as described.

4. In an apparatus for purifying water, the combination, with an open trough or tank having wholly internal bearings, of a revolving purifier having a shaft mounted in said bearings, substantially as described.

5. In an apparatus for purifying water, the combination, with an open trough or tank, provided with internal open topped bearings, of a revolving purifier having a shaft removably mounted in said bearings, substantially as described.

6. In an apparatus for purifying water, the combination, with a revolving purifier, of a trough or tank of greater length than the purifier and provided at its inlet end with a transverse apertured partition forming a receiving chamber, substantially as described.

7. In apparatus for purifying water, the combination with a water tank or receptacle, of a plurality of perforated chambers containing purifying material and revolving in said tank or receptacle, substantially as set forth.

8. In an apparatus for purifying water, the combination with a water tank or receptacle, of a plurality of perforated chambers mounted upon a common axis and containing purifying material and revolving in said tank or receptacle, substantially as set forth.

In testimony that I claim the foregoing as my invention I affix my signature in presence of two witnesses.

RANSOM T. SCOWDEN.

Witnesses:
H. WASHBURN,
IRVINE MILLER.